United States Patent [19]
Thorne

[11] Patent Number: 5,832,191
[45] Date of Patent: Nov. 3, 1998

[54] METHOD AND APPARATUS FOR AUTOMATICALLY ENABLING COMMUNICATION WITH A NETWORK PRINTER

[75] Inventor: Steven D. Thorne, Eagle, Id.

[73] Assignee: Hewlett-Packard Company, Palo Alto, Calif.

[21] Appl. No.: 847,211

[22] Filed: Apr. 30, 1997

[51] Int. Cl.$^6$ ................................................. G06F 15/00
[52] U.S. Cl. ........................................... 395/114; 395/101
[58] Field of Search ..................................... 395/114, 113, 395/112, 115, 101, 117, 104, 116, 200.3, 200.31, 200.32, 200.33, 200.47, 200.49, 200.5, 200.51, 200.53, 200.54, 200.56, 200.57, 200.58, 821, 822, 823, 825, 828–831, 500, 882, 884, 892, 834–839; 400/61, 70, 76

[56] References Cited

U.S. PATENT DOCUMENTS 5,580,177  12/1996  Gase et al. ............................. 395/114

OTHER PUBLICATIONS

Novell InternetWare, Mar. 1997, pp. 3–10, "Novell Distributed Print Services White Paper".
Lan Times, Aug. 19, 1996, vol. 13, Issue 18, pp. 1–2, Salvatore Salamone, "NDPS: The End–All Management Solution?".

*Primary Examiner*—Edward L. Coles
*Assistant Examiner*—Dov Popovici

[57] ABSTRACT

The method of the invention enables a new printer to automatically communicate over a network with client processors connected to the network. The network is at least partially controlled by a network server which, for each respective printer, stores an "agent" data structure. The agent data structure maintains information about the respective client-accessible printer. The method includes the steps of: responding to a message from a new printer by storing printer identification data included in the message; establishing an instance of an agent data structure using data from the message; communicating with the new printer to obtain further data concerning the new printer for addition to the agent data structure; establishing an instance of a communication data structure and inserting data in that data structure to configure a communication procedure which enables communication with both the newly connected printer and the printer's agent data structure; and responding to a printer request from a client processor by employing the communication data structure to automatically establish a communication pathway between the client processor and the new printer and providing data regarding the new printer from the agent data structure to the client processor for use thereby.

12 Claims, 4 Drawing Sheets

METHOD AND APPARATUS FOR AUTOMATICALLY ENABLING COMMUNICATION WITH A NETWORK PRINTER

FIELD OF THE INVENTION

This invention relates to a method for enabling communication with a printer that is newly connected to a network and, more particularly, to a method and apparatus for providing such communication without requiring user or network administrator intervention.

BACKGROUND OF THE INVENTION

Enabling a user to employ printer services that are available over a network can sometimes be a complex task. Initial set-up in current network environments often requires the creation of print queues, printer objects and print servers. Then, such queues, objects and print servers must be properly linked. To send a print job, the client processor usually directs the print job to a network queue; a print server processes the job from the queue and then sends it to a printer. While such a system, when properly configured, works well, it is cumbersome and troubleshooting can be both difficult and time-consuming.

Certain printer products include print server cards which enable connection of a printer to a network without requiring a connected host computer. One such product is the "JetDirect" product, (JetDirect is a trademark of the Assignee of this application). A JetDirect print server card enables a printer to be connected to a network and to be used by multiple client processors. Upon being so connected, the JetDirect product causes transmission of a "Service Advertising Protocol" (SAP) which is an advertisement of the printer's availability. If the network to which the printer is connected is running in accordance with the "NetWare" network protocol (NetWare is a trademark of the Novell Corporation, San Jose, Calif.), the network is controlled by a server which includes a database (i.e. called the "bindery") for receiving and storing SAPs from newly connected printers.

Each SAP includes a limited amount of information which defines the originating printer, its network address, and some capabilities thereof. Upon a user requiring access to a printer, the user calls a utility program running on the user's client processor. That utility program, e.g., the JetAdmin product (JetAdmin is a trademark of the Assignee of this application), selects a mode to find SAPs stored in a network server. Once accessed, the SAP information is downloaded to the client processor and is displayed to the user. The user then selects an appropriate printer and requests that a print queue be set up in the network server to enable interconnection between the client processor and the selected printer. User specification of the print queue and other data are further required to be entered before the appropriate interconnection can be accomplished.

Because establishment of a network printer interconnection requires a level of sophistication on the part of the user, the beginning or less sophisticated user will often experience difficulties in establishing a proper printer/client connection.

Accordingly, it is an object of this invention to provide an improved method for enabling connection of a printer to a network and subsequent use of the printer by client processors on the network.

It is another object of this invention to provide an improved method and apparatus for enabling automatic configuration of all data required to enable access to a newly connected network printer.

SUMMARY OF THE INVENTION

The method of the invention enables a new printer to automatically communicate over a network with client processors connected to the network. The network is at least partially controlled by a network server which, for each respective printer, stores an "agent" data structure. The agent data structure maintains information about the respective client-accessible printer. The method comprises the steps of: responding to a message from a new printer by storing printer identification data included in the message; establishing an instance of an agent data structure using data from the message; communicating with the new printer to obtain further data concerning the new printer for addition to the agent data structure; establishing an instance of a communication data structure and inserting data in that data structure to configure a communication procedure which enables communication with both the newly connected printer and the printer's agent data structure; and responding to a printer request from a client processor by employing the communication data structure to automatically establish a communication pathway between the client processor and the new printer and to provide data regarding the new printer from the agent data structure to the client processor for use thereby.

DETAILED DESCRIPTION OF THE INVENTION

Recently, the Novell Corporation has announced a print services architecture entitled "Novell Distributed Print Services" (NDPS). NDPS is a distributed, client-server, application-layer print service for network environments. It includes client, server and printer software components which link and enable the sharing of network printers with applications running on client processors. The invention to be described hereinbelow will be considered in the context of an NDPS network environment, but it is to be understood that the NDPS environment is used for exemplary purposes only and that the invention is equally applicable to other network environments.

Figure 1:
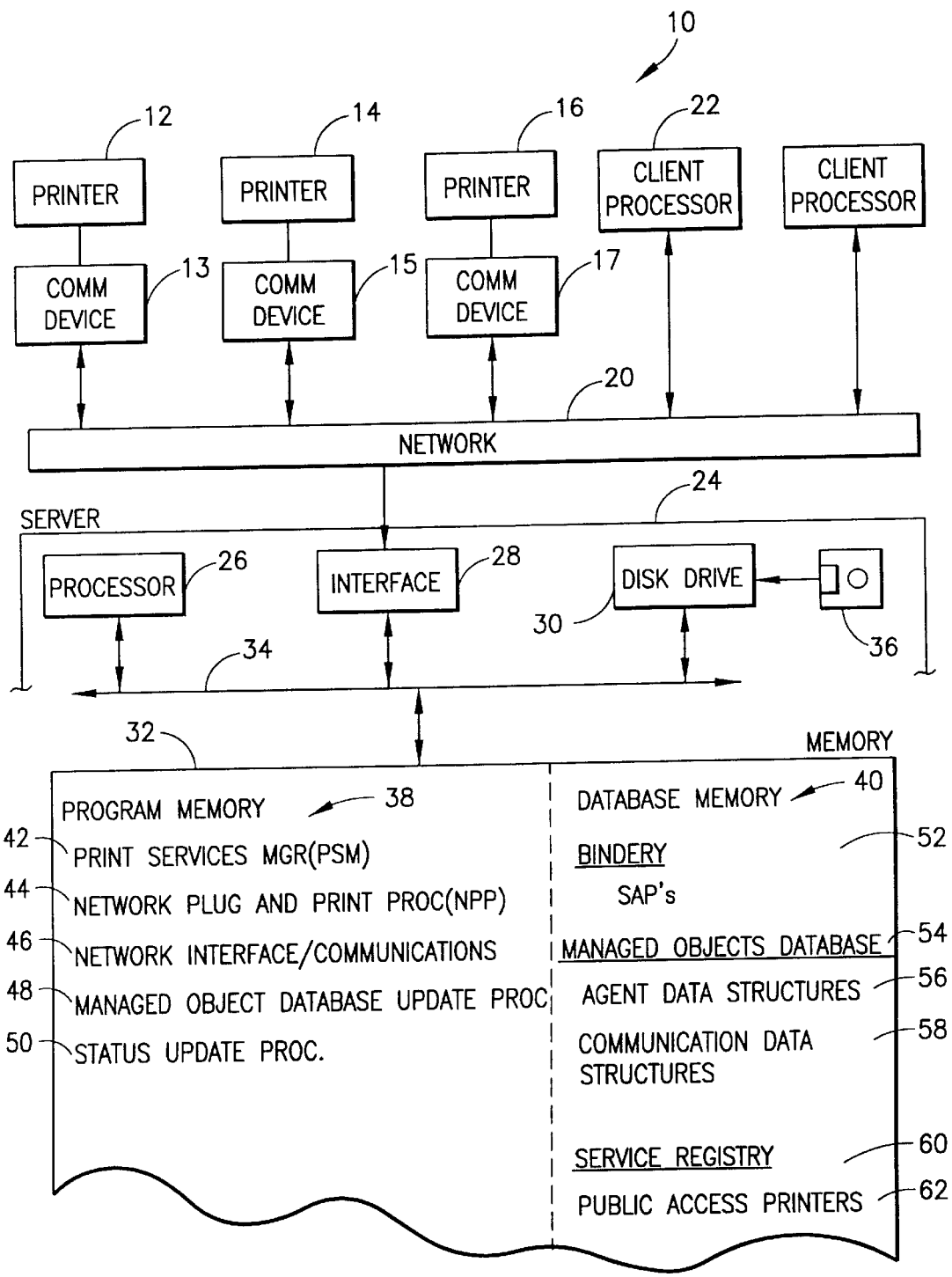
FIG. 1 is a high level block diagram of network and a network server which is adapted to perform the invention hereof.

Referring to FIG. 1, a system 10 includes a plurality of printers 12, 14, 1 6, etc. that are connected to a network 20 via communication devices 13, 15, 17 etc. One or more client processors 22 are also coupled to network 20 and may, or may not, have coupled printers. A network server 24 is connected to network 20 and performs overall network management services, including a network "network plug and print" service which comprises the invention hereof. In brief, the network plug and print service enables a newly connected printer to be automatically recognized by network server 24; appropriate data structures to be created to enable communication with the printer; and for appropriate procedures to be enabled which allow a requesting client to couple to a network printer, all without requiring user or network administrator intervention.

To perform the network plug and print procedure, network server 24 utilizes a processor 26, a network interface 28, a disk drive 30 and a memory 32, all of which communicate via a bus system 34. Disk drive 30 enables the loading of control software into network server 24 (e.g., from disk 36) to enable the performance of the invention. Hereafter, it will be assumed that the necessary processes and control programs have already been loaded and are currently stored in memory 32.

Memory 32 includes a program section 38 for storage of procedures used to control network server 24 (and network 20) and a database section 40 which is utilized to hold various databases. Program section 38 includes a print services manager (PSM) 42 which provides overall management functionality for network server 24 and all of the subservient procedures contained in program section 38. Network plug and print procedure 44 is the principal procedure utilized to enable recognition of a printer that is newly connected to network 20 and to enable establishment of the appropriate databases and data structures to allow subsequent access to the newly connected printer. Network interface communication procedure 46 is a process which enables communication over network 20, using the network protocol to accomplish required communication actions. A managed object database (MOD) update procedure 48 enables an updating of data stored in data structures that are contained in database section 40 of memory 32. Status update procedure 50 enables a periodic updating of the status of various units connected to the network and a downloading of new status data into various data structures contained within database section 40.

Database section 40 includes, among others, three principal databases that will be hereafter considered. A bindery section 52 includes SAPs that are received from newly connected printers and stores the data accompanying each SAP. A managed objects database (MOD) section 54 includes an agent data structure 56 for each network printer and a communication data structure 58 for each network printer. In brief, each agent data structure 56 includes all information available regarding an associated printer, e.g., print speed, number of trays, print resolution, status of all print functions, etc., etc.

Each agent data structure 56 has an associated communication data structure 58 which includes the associated agent data structure name, the network address of the associated printer; any route information needed to access the associated printer; data needed to enable access to network interface/communication procedure 46, print services manager 42, status update procedure 50, etc., etc.

A service registry section 60 includes a listing of "public access printers" 62 which are printers that are connected to network 20 and have had agent data structures 56 and communication data structures 58 established therefor. Such public access printers are thereby available for access by client processors over network 20.

Figure 2:
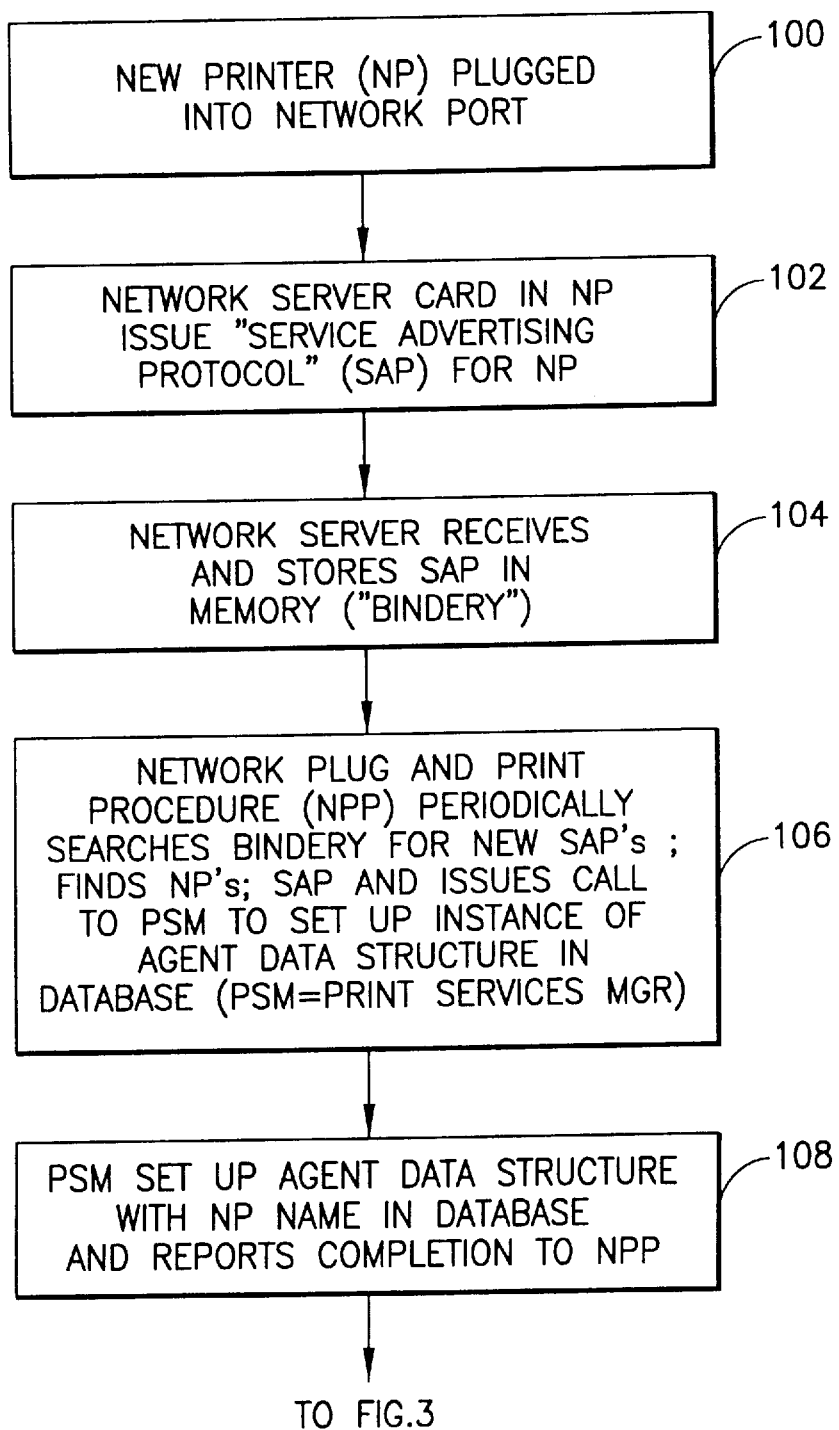
FIGS. 2–4 illustrate a logical flow diagram which describes the procedure performed by a network server in enabling access to a newly connected printer by one or more client processors connected to the network.
Figure 3:
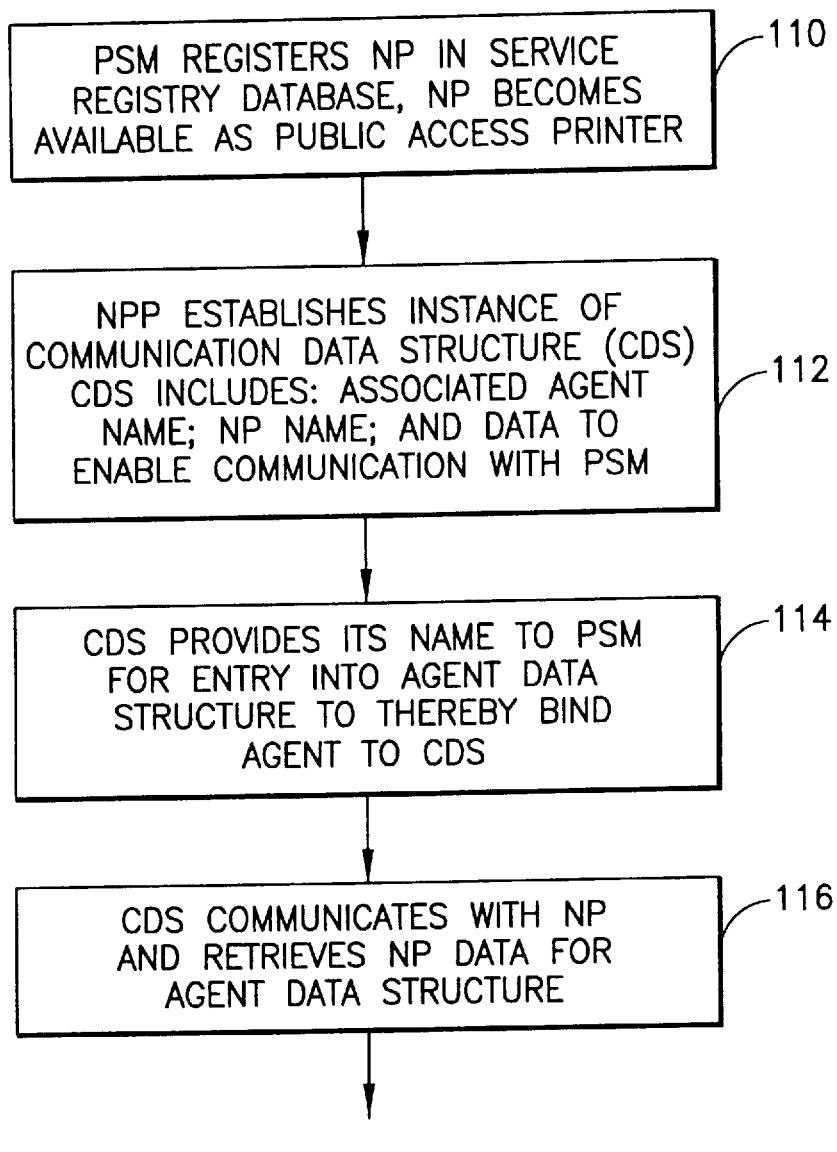
Figure 4:
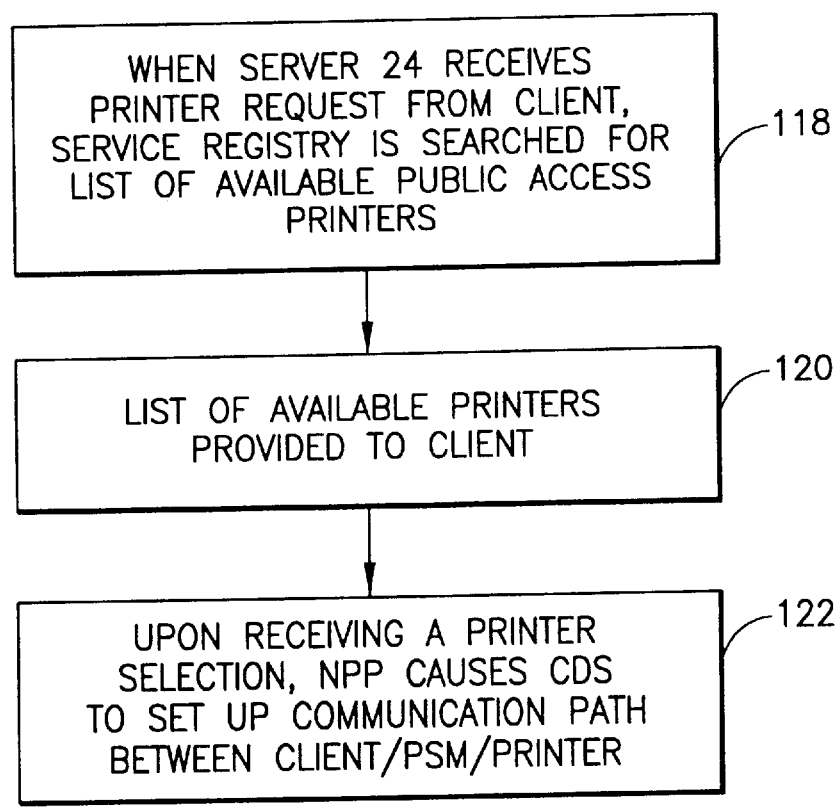

Turning now to FIGS. 2–4, the procedure employed by the invention to enable a network plug and print action with respect to a printer that is newly connected to network 20, will be described. Initially, it is assumed that a new printer (NP) (e.g., printer 12) is plugged into a network port (box 100). Thereafter, the communication card (e.g., communication card 13) in new printer 12 issues a service advertising protocol (SAP) message. The SAP includes at least the address of communication card 13 and the name of printer 12 (box 102). Network server 24 receives and stores the new SAP in bindery 52 (box 104). Network plug and print procedure 44 is set up to periodically search bindery 52 for new SAPs. When a new SAP is found for new printer 12, a call is issued to PSM 42 to establish an instance of an agent data structure in managed objects database 54 (box 106). In response to that call, PSM 42 sets up an agent data structure in managed objects database 54 and includes therein, the name received via the SAP from new printer 12 (box 108).

Next, PSM 42 registers the new printer name in service registry database 60, causing that printer to become a "public access" printer (box 110). Then network plug and print procedure 44 establishes an instance of a communication data structure (CDS) 58, specifically for use with the just created agent data structure 56 that is associated with new printer 12 (box 112). The new instance CDS 58 includes, among other data, the name of the associated agent data structure; the address of new printer 12 and any route information required to reach new printer 12; data to enable communication with PSM 42; and further data which enables access to other procedures within program memory section 38, e.g., network interface/communication procedure 46, MOD update procedure 48 and Status update procedure 50.

Thereafter, newly created instance of CDS 58 provides its "name" to PSM 42 for entry into the associated agent data structure 56. Such action "binds" the new instance of CDS 58 to the newly created agent data structure 56 (box 114). Upon completion of the binding action, CDS 58 communicates with new printer 12 (box 116) and obtains further data concerning new printer 12 to enable subsequent communication and control thereof. Such data includes, for example, number of trays, print resolution, various status indications concerning the printer, etc.

Once the data is received by CDS 58, it is passed to managed objects database 54 for inclusion in the respectively associated agent data structure 56. New printer 12 is now available for access by a client processor. (Note that no user intervention has been required to either set up or operate the relevant data structures and processes.)

Thereafter, when server 24 receives a printer request from a client processor, server 24 causes a search to be made of service registry database 60 and the listing of public access printers 62 for an available printer (box 118). A list of available printers (and their capabilities) is then provided to the client processor (box 120), where the user is enabled to select one for a print job. The data for each available public access printer provided to the client processor is acquired from agent data structures 56, stored in MOD 54. The information provided to the client processor not only indicates printer availability, but also other document, device and property characteristics required to enable assessment of whether a printer is adapted to carrying out the print job.

Thereafter, upon sensing a selection of a printer by a user at a client processor, PSM 42, in conjunction with CDS 58, enables the client processor to access the respectively selected printer (box 122).

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for enabling a new printer to communicate over a network with one or more client processors connected to the network, the network at least partially controlled by a network server which, for each respective client-accessible printer, includes an agent data structure which maintains information about the respective client-accessible printer, said method comprising the steps of:

a) responding to a message from the new printer with identification data that identifies the new printer, by storing the identification data in a memory;

b) further responding to said message by automatically establishing an instance of the agent data structure using said identification data;

c) still further responding to said message by automatically establishing an instance of a communication data structure, said communication data structure including data enabling access to a communication procedure and further data enabling communication with said agent data structure; and d) responding to a printer request from a client processor by employing, without further user intervention, said communication data structure to enable automatic establishment of a communication pathway between said client processor and said new printer, and providing data regarding said new printer from said agent data structure to said client processor for use thereby.

2. The method as recited in claim 1, wherein step b) further communicates with said new printer to obtain further data concerning said new printer, for addition to said agent data structure.

3. The method as recited in claim 1, wherein step d) causes a search to be made of communication data structures to determine which printers are available and match a client processor's print request requirements.

4. The method as recited in claim 1, wherein step d) causes a search to be made of communication data structures to determine which printers are available and to provide a list of available printers to the client processor.

5. The method as recited in claim 4, wherein step d) responds to a request from said client processor for a specific available printer to establish a communication pathway between said client processor and the printer that was requested.

6. The method as recited in claim 1, wherein step b) is preceded by a periodic search of said identification data stored in said memory, a finding of such data enabling operation of step b).

7. A storage media for controlling a server to enable a new printer to communicate over a network with one or more client processors connected to the network, said storage media comprising:

a) means for controlling said server to respond to a message from the new printer with identification data that identifies the new printer, by storing the identification data in a memory;

b) means responsive to said message for automatically controlling said server to establish an instance of a agent data structure using data from said identification data;

c) means responsive to said message for automatically controlling said server to establish an instance of a communication data structure, said communication data structure including data enabling access to a communication procedure and further data enabling communication with said agent data structure; and d) means for controlling said server to respond to a printer request from a client processor, without further user intervention, by employing said communication data structure to enable automatic establishment of a communication pathway between said client processor and said new printer, and by providing data regarding said new printer from said agent data structure to said client processor for use thereby.

8. The storage media as recited in claim 7, wherein said means b) includes means for controlling said server to communicate with said new printer to obtain further data concerning said new printer, for addition to said agent data structure.

9. The storage media as recited in claim 7, wherein means d) causes a search to be made of communication data structures to determine which printers are available and match a client processor's print request requirements.

10. The storage media as recited in claim 7, wherein means d) causes a search to be made of communication data structures to determine which printers are available and to provide a list of available printers to the client processor.

11. The storage media as recited in claim 10, wherein means d) responds to a request from said client processor for a specific available printer to establish a communication pathway between said client processor and the printer that was requested.

12. The storage media as recited in claim 7, wherein means b) first performs a periodic search of said memory for new printer identification data, a finding of such data enabling establishment of said agent data structure.

* * * * *